Nov. 14, 1939.   E. A. LINK, JR   2,179,663
RECORDER
Filed Sept. 30, 1936   4 Sheets-Sheet 1

INVENTOR.
EDWIN A. LINK, JR.
BY
ATTORNEY.

Nov. 14, 1939.  E. A. LINK, JR  2,179,663
RECORDER
Filed Sept. 30, 1936   4 Sheets-Sheet 2
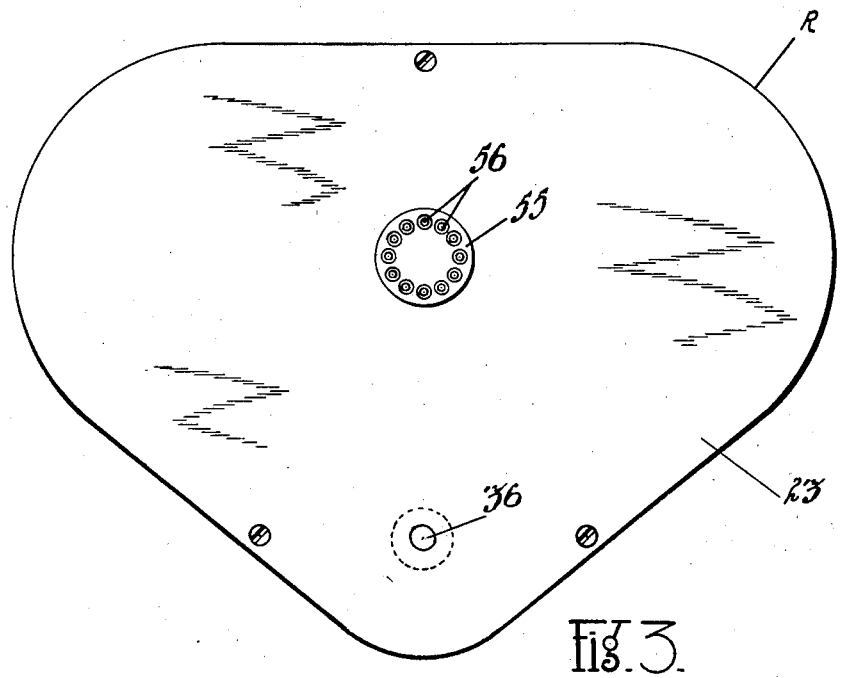
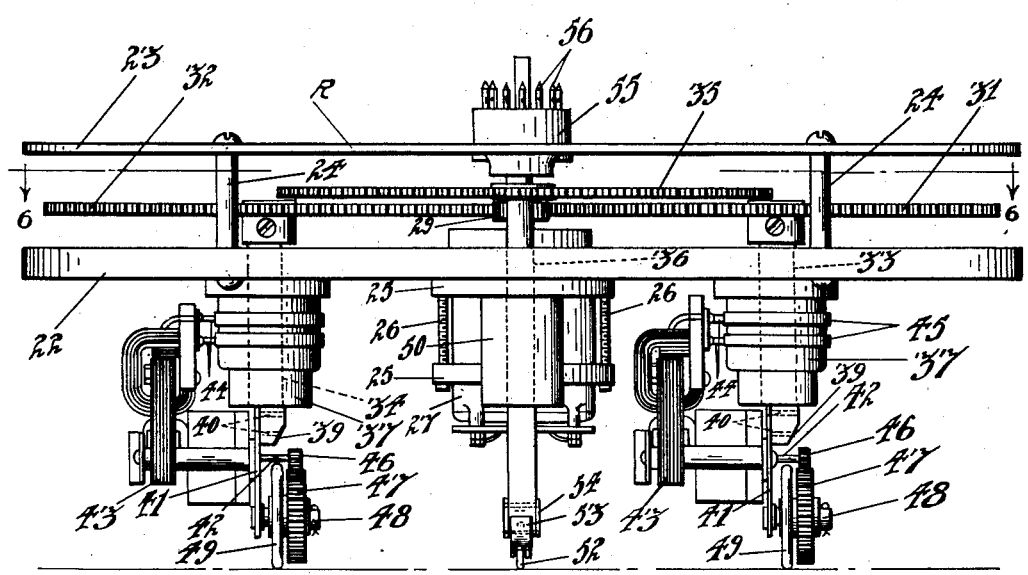
INVENTOR.
EDWIN A. LINK, JR.
BY
ATTORNEY.

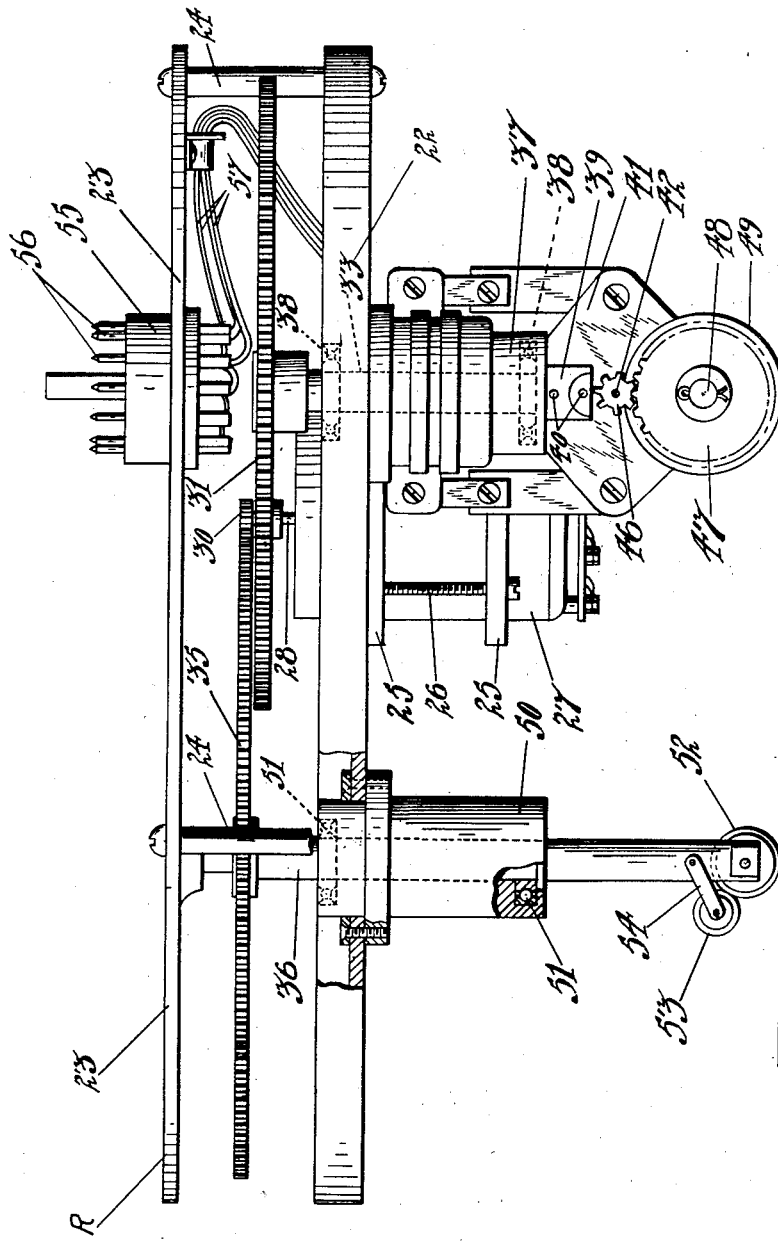

Nov. 14, 1939.   E. A. LINK, JR   2,179,663
RECORDER
Filed Sept. 30, 1936   4 Sheets-Sheet 4

INVENTOR.
EDWIN A. LINK, JR.
BY Philip S. Hopkins
ATTORNEY.

Patented Nov. 14, 1939

2,179,663

UNITED STATES PATENT OFFICE 2,179,663

RECORDER

Edwin A. Link, Jr., Binghamton, N. Y.

Application September 30, 1936, Serial No. 103,377

3 Claims. (Cl. 234—1.5)

My invention relates to a recorder and particularly to a recording means for transcribing on a chart the movement of an instrument remote from the recorder and connected therewith by means of autosynchronous motors of the Selsyn type and electrical conductors.

My invention is particularly useful and will be illustrated and described in connection with an aviation trainer such as is described in my prior Patent No. 1,825,462 dated September 29, 1931, and also my co-pending application, Serial No. 737,081, filed July 26, 1934, in which students are trained in the art of flying by instruments.

An important object of my invention lies in the provision of a recording means whereby every turning movement of the trainer will be simultaneously made by the recorder and whereby the recorder moves continuously in whatever direction it is turned to, such movement being in proportion to the predetermined and assumed forward "speed" of the trainer, simulating the flight of an aeroplane through the air.

Another object of my invention lies in the provision of a recording means of this character which provides on a suitable chart an exact record of the movements of the trainer or other instrument with which the recorder is connected, wherebyby there is preserved an accurate indication of the performance of the pilot or operator of the trainer or other instrument.

Although I have shown and will describe my invention as particularly and especially applicable to trainers for aviators, it will be understood that I do not wish to be limited to such use as it will be obvious from the invention as the description thereof proceeds, that the recorder is capable of a wide variety of uses and in connection with many and various types of instruments wherein it is desired to record on a chart the movements thereof.

Referring now to the drawings accompanying this application and wherein like reference numerals indicate like parts:

Figure 3 is a top plan view of the recorder showing the cover plate and the electrical contact or connecting means for the autosynchronous motors.

Figure 4 is a front edge view of the recorder.

Figure 5 is a side edge view of the recorder, certain parts being broken away from clearness of illustration.

Figure 1:
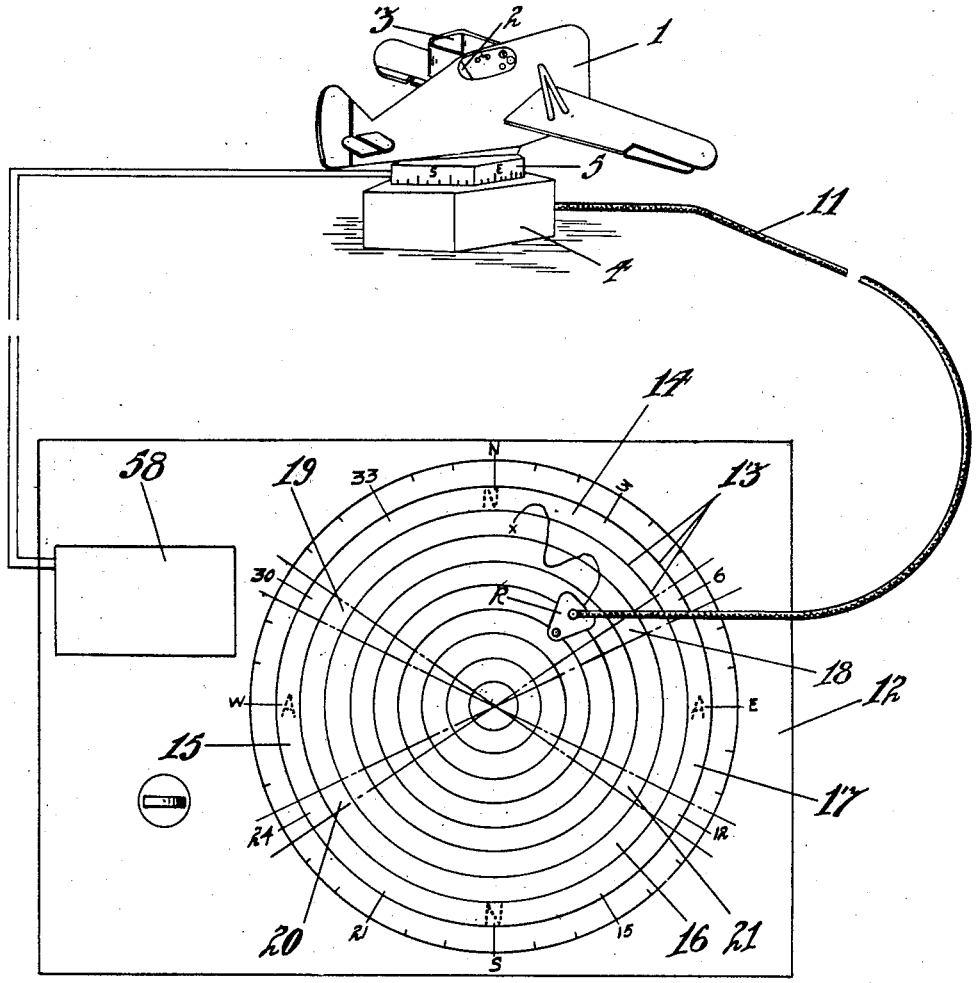
Figure 1 is a top plan view of a chart upon which my recorder operates, and including a perspective diagrammatic view of a trainer showing the connections between the same and the recorder.

The reference character 1 refers to a trainer for aviators and which comprises generally a frame 10 provided with a cockpit 2 over which is adapted to be placed a hood or housing 3 to enclose the student pilot therein. The trainer is built to simulate an aeroplane with wings, tail group, etc. and is provided with means for moving the 15 trainer through all the various positions which an aeroplane may take in actual flight, except completely turning over. The trainer is mounted upon a base 4 provided with a portion 5 marked off with compass directions and the trainer is 20 rotatably mounted upon such base for complete 360 degree rotation thereon.

Figure 2:
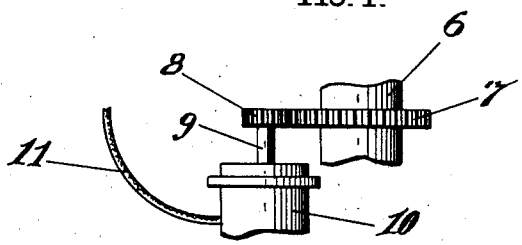
Figure 2 is a detail side view of the driving connection between the trainer and the autosynchronous motor thereon.
Figure 6:
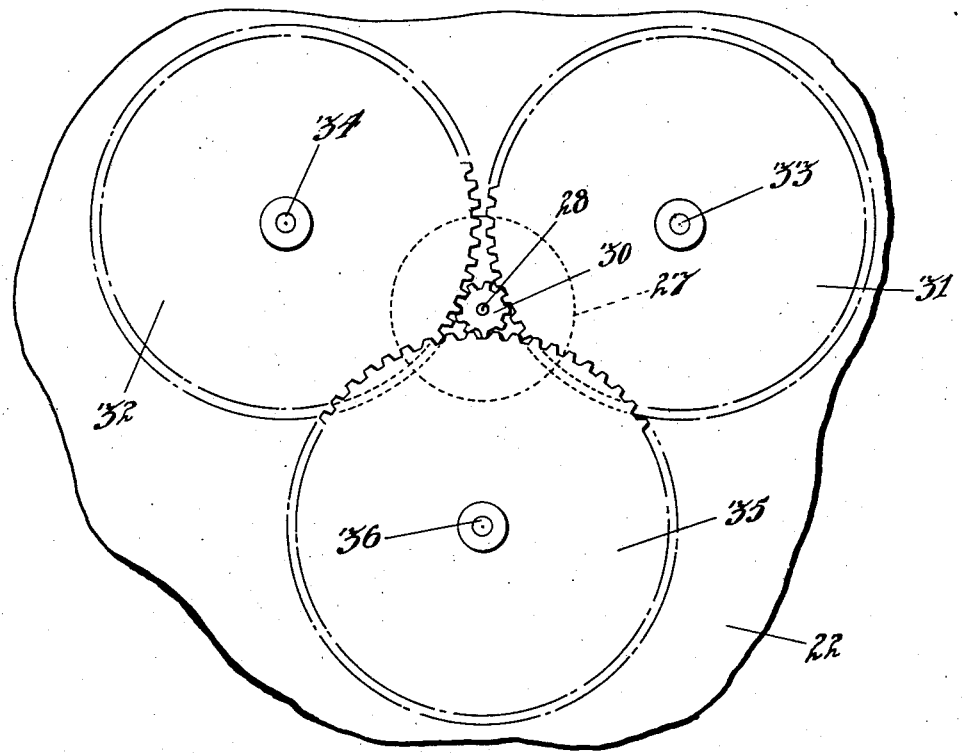
Figure 6 is a detail top plan view illustrating the gearing of the recorder.
Figure 7:
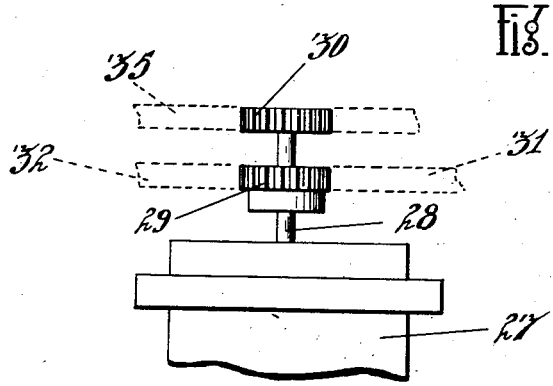
Figure 7 is a detail side view showing the driving means for the gearing.

The detailed construction and operation of the trainer form no part of this invention and have not been shown nor will they be described 25 herein in detail. Reference is made to applicant's prior patent and co-pending application above cited for such details. Suffice it to say here that the trainer is suitably mounted upon a rotatable shaft 6 (see Figure 2) which shaft is provided 30 with a gear 7 meshing with a pinion 8 on the shaft 9 of an autosynchronous motor 10 suitably supported on the trainer base. Rotary movements of the trainer therefore result in simultaneous and like movements of the shaft 9 of the motor 10 35 and which movements are translated through such motor into the electrical impulses which pass through the cable 11 to the recorder.

In the normal use of the trainer, an instructor is usually positioned at a desk or table, in full 40 view of the trainer, and as fuly explained in applicant's co-pending application Serial No. 737,081, the instructor transmits signals to the student pilot in the trainer in accordance with the position of the trainer with respect to a predetermined 45 location, the problem being for the student to interpret such signals and after a predetermined lapse of time based upon asumed "speed" of the trainer, to bring the trainer to such predetermined location. 50

Heretofore it has been necessary for the instructor to mark by hand upon a suitable chart, the path or "flight" of the trainer during such instruction. In addition to burdening the instructor with this marking of the course of the trainer 55 on the chart, there has always been the chance for error on the part of the instructor in marking such course and there also exists the question in the mind of the student pilot as to whether the instructor properly recorded the test "flight".

By my recording means I have eliminated these problems and am able to accurately record the exact path or course of the trainer exactly as the student responds to the signals transmitted by the instructor.

The reference character 12 indicates a chart such as may be used in this connection and on which there is printed or otherwise suitably inscribed, concentric circles 13, the distance between which corresponds to a certain elapsed time based upon a predetermined and assumed "speed" of the trainer in simulation of an aeroplane in flight. At the center of the circles it is assumed there is a radio station adjacent an airport for broadcasting directional signals outwardly in four sections 14, 15, 16 and 17. In these sections the signals sent out are the usual Morse code dot and dash signals representing the letters A and N, the signal N being sent out in the section 14, the letter A in 15, N in 16, and A in 17, thus alternating the signals in adjacent sections. In the marginal areas of these sections where the A and N signals overlap, such overlapping of the dot-dash A signal and the dash-dot N signal combine to produce a continuous hum in a path slightly diverging from the central point outwardly and such constituting the "on course" signals or "beams" converging upon the center point. As shown in Figure 1, these beams are illustrated on the chart as 18, 19, 20, and 21.

It will be clear, therefore, that if the instructor arbitrarily locates the trainer at any given position on the chart, by watching the direction of the trainer and the length of time it stays in any given direction, the instructor can transmit the signals to the pilot in the trainer corresponding to his position as arbitrarily located on the chart and can trace on the chart the path of the "flight" of the trainer from such point until the test "flight" is completed.

By my invention this flight path can be traced automatically by my recorder which will now be described in detail.

The recorder is indicated generally as R and comprises a supporting plate 22 above and spaced from which is a top or cover plate 23 secured in parallel spaced relation with the supporting plate by means of screws 24. Suitably supported on the underside of the plate 22, as by the frame 25 and screws 26, is an autosynchronous motor 27, the shaft 28 of which extends upwardly through the plate 22 and is provided at its upper end with the spaced pinions 29 and 30. The lower pinion 29 meshes with two relatively large gears 31 and 32 suitably mounted upon shafts 33 and 34 respectively journaled in the base plate 22. The upper pinion 30 meshes with a gear 35 mounted upon a shaft 36 also journaled in the base plate 22. Obviously therefore, rotation of the motor shaft 28 will result in simultaneous and like motion of the gears 31, 32 and 35.

The shafts 33 and 34 of the gears 31 and 32 extend downwardly through the plate 22 and through bushings 37 secured to the underside of the plate 22. These shafts are provided with ball bearing journals 38 in the plate 22 and in the bushings 37.

The lower end of the shafts 33 project below the bushings 37 as at 39 and secured to such lower projecting ends, as by the bolts or screws 40, are supporting brackets 41, through which are journaled the shafts 42 of motors indicated generally at 43, also supported on the brackets 41. The motors 43 are provided with brushes 44 which contact rings 45 around the bushings 37 and through which rings and brushes the motors are provided with electric current for rotating the shafts 42 thereof.

The projecting ends of the shafts 42 are provided with pinions 46 meshing with driving gears 47 mounted upon shafts 48 journaled in the frames 41. Also mounted upon the shafts 48 are propelling wheels 49 by means of which the recorder is supported and by which it moves.

The shaft 36 upon which the gear 35 is mounted, also projects downwardly through the plate 22 and through a bushing 50, said shaft being provided with ball bearing journals 51 in the plate 22 and in the bushing 50. The lower projecting end of the shaft 36 has suitably journaled thereon a marking wheel 52 adapted to receive ink from an inking roller 53 pivotally mounted upon the shaft 36 as by the link 54. The periphery of the inking roller 53 rides upon the wheel 52 to keep the periphery thereof supplied with ink.

The top plate 23 is provided with an electric contact plug or terminal 55 provided with contact pins 56 adapted to receive and engage with a plug carried at the end of the cable 11, whereby electric contact is established between the autosynchronous motor 10 on the trainer and the autosynchronous motor 27 on the recorder, as well as supplying current to the motors 43. Suitable wires 57 connect the terminal plug 55 with the motors 27 and 43. Any suitable source of current may be provided, the same being diagrammatically illustrated at 58 in Figure 1.

The operation of my invention is as follows: Assume that a student pilot is positioned in the trainer 1 and ready to begin his test "flight". The instructor places the recorder R at any selected point on the chart 12 before him such as for instance at the point marked "X" in section 14, on the chart. The instructor then transmits signals to the student in the trainer corresponding to such position, namely, the N signal and at a relatively low volume because of the distance from the "airport" or center of the chart. The student by noting the signals as they are received by him and checking their variation in volume and change in character as he turns the trainer from one direction to another, locates himself with respect to the airport and "flies" to it as near as he can. The recorder R moves continuously and at a rather low rate of speed proportional to the assumed "speed" of the trainer and the circles on the chart. The recorder also turns on the chart simultaneously with and exactly corresponding to every turn of the trainer because of the autosynchronous motor 10 on the trainer and the communication of the electric impulses therefrom through the cable 11 to the autosynchronous motor 27 on the recorder. Every turning movement of the shaft 28 of the motor 27 on the recorder results in rotation of the gears 31, 32 and 35, through the pinions 29 and 30, thus causing the propelling wheels 49 and the marking wheel 52 to turn in the same manner and direction thereby tracing upon the chart the complete course of the trainer.

After the test flight has been completed, the pilot and instructor are thus provided with an accurate chart of the "flight" just concluded and from which can be readily observed errors and diversions from the proper course from the original assumed starting point to the assumed airport or radio station.

It will now be clear that although my recorder is particularly adaptable for use with trainers of the character described, it is also equally adaptable for recording the movements of other and varied instruments as well.

Of course, changes may be made in details of construction and arrangement of parts without departing from the spirit and scope of my invention. I do not limit myself, therefore, to the exact form herein shown and described other than by the appended claims.

I claim:

1. In combination with a trainer, ship or the like mounted for rotation about a fixed axis, an autosynchronous motor therein responsive to such rotation, a recorder remote therefrom having a marking wheel and propelling wheels, a chart over which said recorder is adapted to be moved in accordance with simulated movement of said trainer or ship, means for operating said propelling wheels to move said recorder at a speed corresponding to an assumed forward speed of said trainer or ship, and means on said recorder and connected with said propelling wheels to turn the same directionally as the direction of the trainer ship changes, said means including an autosynchronous motor on said recorder electrically connected with the autosynchronous motor on said trainer or ship.

2. In combination with a training device for aviators or the like, mounted for rotation about a fixed axis, a recording device having marking means thereon and propelling means associated therewith, a chart over which said recorder is adapted to move in accordance with the simulated movement of said trainer, means associated with said trainer and said recorder to move said recorder over said chart at a sped corresponding to an assumed forward speed of said trainer, and means on said recorder associated with said propelling means to turn said recorder directionally as the direction of simulated movement of said trainer changes.

3. In combination with a training device for aviators or the like, mounted for rotation about a fixed axis, a course recorder of the type having motors for designating distance and direction, said direction motor being connected to said trainer in such manner as to cause the recording means to move in a direction corresponding to the orientation of the trainer, and said distance mortor being provided with means for driving said course recorder at a rate corresponding to the assumed forward speed of the trainer.

EDWIN A. LINK, Jr.